United States Patent
Zhao et al.

(10) Patent No.: US 12,545,059 B2
(45) Date of Patent: Feb. 10, 2026

(54) SYSTEMS AND METHODS FOR TIRE TREADWEAR SENSING

(71) Applicant: The Goodyear Tire & Rubber Company, Akron, OH (US)

(72) Inventors: Junling Zhao, Hudson, OH (US); Peter Jung-min Suh, Stow, OH (US); Jeffrey McKay West, North Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 18/635,129

(22) Filed: Apr. 15, 2024

(65) Prior Publication Data

US 2024/0408920 A1    Dec. 12, 2024

Related U.S. Application Data

(60) Provisional application No. 63/506,934, filed on Jun. 8, 2023.

(51) Int. Cl.
*B60C 11/24* (2006.01)
*B60C 19/00* (2006.01)

(52) U.S. Cl.
CPC ...... *B60C 11/243* (2013.01); *B60C 2019/004* (2013.01)

(58) Field of Classification Search
CPC ..... B60C 11/24; B60C 11/243; B60C 11/246; B60C 2019/004; B60C 23/0408
See application file for complete search history.

(56) References Cited

U.S. PATENT DOCUMENTS

| | | |
|---|---|---|
| 6,443,198 B1 | 9/2002 | Koch |
| 6,444,069 B1 | 9/2002 | Koch |
| 6,523,586 B1 | 2/2003 | Eromaki et al. |
| 6,546,982 B1 | 4/2003 | Brown et al. |
| 6,885,291 B1 | 4/2005 | Pollack et al. |
| 6,889,153 B2 | 5/2005 | Dietiker |
| 7,204,135 B2 | 4/2007 | Robert |
| 7,249,620 B2 | 7/2007 | Croissant et al. |
| 7,280,036 B2 | 10/2007 | Kafrawy |
| 7,284,417 B2 | 10/2007 | Reynolds |

(Continued)

FOREIGN PATENT DOCUMENTS

| | | |
|---|---|---|
| DE | 19745734 B4 | 4/1999 |
| DE | 19838638 A1 | 3/2000 |

(Continued)

OTHER PUBLICATIONS

Search Report for European Application No. EP 24 17 8774 dated Oct. 21, 2024.

*Primary Examiner* — Cedrick S Williams
(74) *Attorney, Agent, or Firm* — Edward T. Kennedy (57) ABSTRACT

Disclosed are various embodiments for sensing wear of a tire tread. A tire comprises an innerliner, a plurality of belts layered adjacent to the innerliner, a tread adjacent to the plurality of belts opposite the innerliner and a treadwear sensor positioned in the innerliner. The treadwear sensor comprises a base plate on an interior side of the innerliner and a tube extending from the base plate through the innerliner and the plurality of belts to a first wear depth in the tread. When the tread is worn to the first wear depth, an end of the tube is exposed through the tire.

6 Claims, 6 Drawing Sheets

(56) References Cited

U.S. PATENT DOCUMENTS

| | | |
|---|---|---|
| 7,367,496 B2 | 5/2008 | Karstens |
| 7,404,319 B2 | 7/2008 | Poulbot et al. |
| 7,557,694 B1 | 7/2009 | Graham |
| 7,604,029 B2 | 10/2009 | Myatt |
| 8,061,191 B2 | 11/2011 | Hanatsuka |
| 8,596,117 B2 | 12/2013 | Wilson et al. |
| 8,996,239 B2 | 3/2015 | Orlewski |
| 9,016,118 B2 | 4/2015 | Townsend et al. |
| 9,283,817 B2 | 3/2016 | Sandstrom et al. |
| 9,352,615 B2 | 5/2016 | Djelloul-Mazouz |
| 9,649,889 B2 | 5/2017 | Engel |
| 11,090,984 B2 | 8/2021 | Pulford et al. |
| 2004/0154715 A1 | 8/2004 | Dufournier |
| 2005/0044943 A1 | 3/2005 | Godeau et al. |
| 2005/0242935 A1 | 11/2005 | Kafrawy |
| 2006/0090558 A1 | 5/2006 | Raskas |
| 2007/0245819 A1* | 10/2007 | Robert ............ B60C 11/243  73/146 |
| 2009/0114322 A1 | 5/2009 | O'Brien |
| 2009/0277262 A1 | 11/2009 | Rensel et al. |
| 2012/0011926 A1 | 1/2012 | Bigot et al. |
| 2012/0300809 A1 | 11/2012 | Weston |
| 2014/0360256 A1 | 12/2014 | Orlewski |
| 2014/0365069 A1* | 12/2014 | Orlewski ............ B60C 11/0302  73/146 |
| 2019/0184773 A1 | 6/2019 | Saito |
| 2020/0047566 A1 | 2/2020 | Kim et al. |
| 2020/0338932 A1 | 10/2020 | Räisänen et al. |
| 2022/0185030 A1 | 6/2022 | Zhao et al. |
| 2022/0185033 A1* | 6/2022 | West ................ B60C 11/246 |

FOREIGN PATENT DOCUMENTS

| | | |
|---|---|---|
| DE | 20216290 U1 | 1/2003 |
| DE | 102007001279 A1 | 7/2008 |
| DE | 102010000003 A1 | 7/2011 |
| EP | 0383401 A1 | 8/1990 |
| EP | 1798071 A2 | 12/2006 |
| EP | 1798070 A1 | 6/2007 |
| EP | 3498499 A1 | 6/2019 |
| EP | 4015252 A1 | 6/2022 |
| JP | 1-307526 A | 12/1989 |
| JP | 2005-028950 A | 2/2005 |
| KR | 10214829 B1 | 6/2022 |
| WO | 03/059656 A1 | 7/2003 |

\* cited by examiner

SYSTEMS AND METHODS FOR TIRE TREADWEAR SENSING

BACKGROUND

As tires are used on a vehicle, the rubber in the tread gradually breaks away causing the tread to become shallower and decreasing overall tire performance. When the tread is too shallow, the tire may become unsafe in certain driving conditions. For example, shallow tread decreases traction in wet or icy conditions. Further, shallow tread may impact braking distance and the likelihood of having a tire blowout. In addition to causing unsafe driving conditions, treadwear can be indicative of other issues with a vehicle. Uneven treadwear on a tire may indicate an improper alignment, overinflation, underinflation, or potentially an issue with the vehicle's suspension.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

"Axial" and "axially" mean lines or directions that are parallel to the axis of rotation of the tire.

"Axially inward" and "axially inwardly" refer to an axial direction that is toward the axial center of the tire.

"Axially outward" and "axially outwardly" refer to an axial direction that is away from the axial center of the tire.

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Footprint" means the contact patch or area of contact created by the tire tread with a flat surface, such as the ground, as the tire rotates or rolls.

"Innerliner" means the layer or layers of elastomer or other material that form the inside surface of a tubeless tire and that contain the inflating fluid within the tire.

"Lateral" means an axial direction.

"Radial" and "radially" mean lines or directions that are perpendicular to the axis of rotation of the tire.

"Radially inward" and "radially inwardly" refer to a radial direction that is toward the central axis of rotation of the tire.

"Radially outward" and "radially outwardly" refer to a radial direction that is away from the central axis of rotation of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

"Tread element" or "traction element" means a rib or a block element defined by a shape having adjacent grooves.

DETAILED DESCRIPTION

Figure 1:
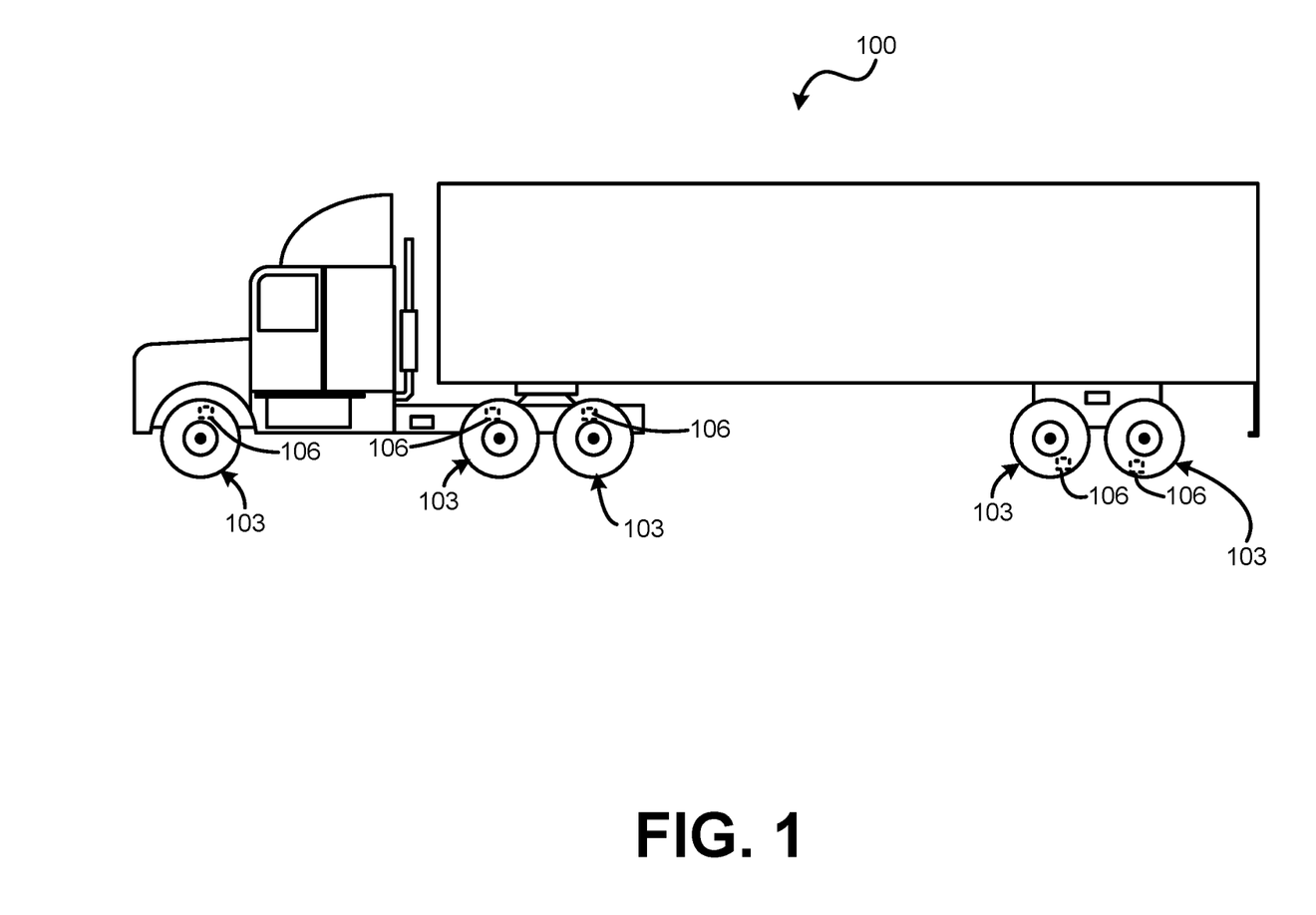
FIG. 1 is a drawing of a vehicle with one or more tires that include a treadwear sensor according to various embodiments of the present disclosure.

With particular reference to FIG. 1, a vehicle 100 is shown having one or more tires 103. Each tire 103 includes a treadwear sensor 106 which is capable of indicating the wear on the tire 103. According to various embodiments, each one of the tires 103 on the vehicle 100 may include one or more of the treadwear sensors 106. While the vehicle 100 is depicted as a commercial truck, the vehicle 100 may comprise any other type of vehicle which employs tires, where the commercial truck is presented as an example. To this end, the vehicle 100 may comprise other vehicles falling into various categories such as passenger vehicles, off-road vehicles, and the like, in which such vehicles may include a greater or lesser number of tires 103 than are shown in FIG. 1.

Figure 2:
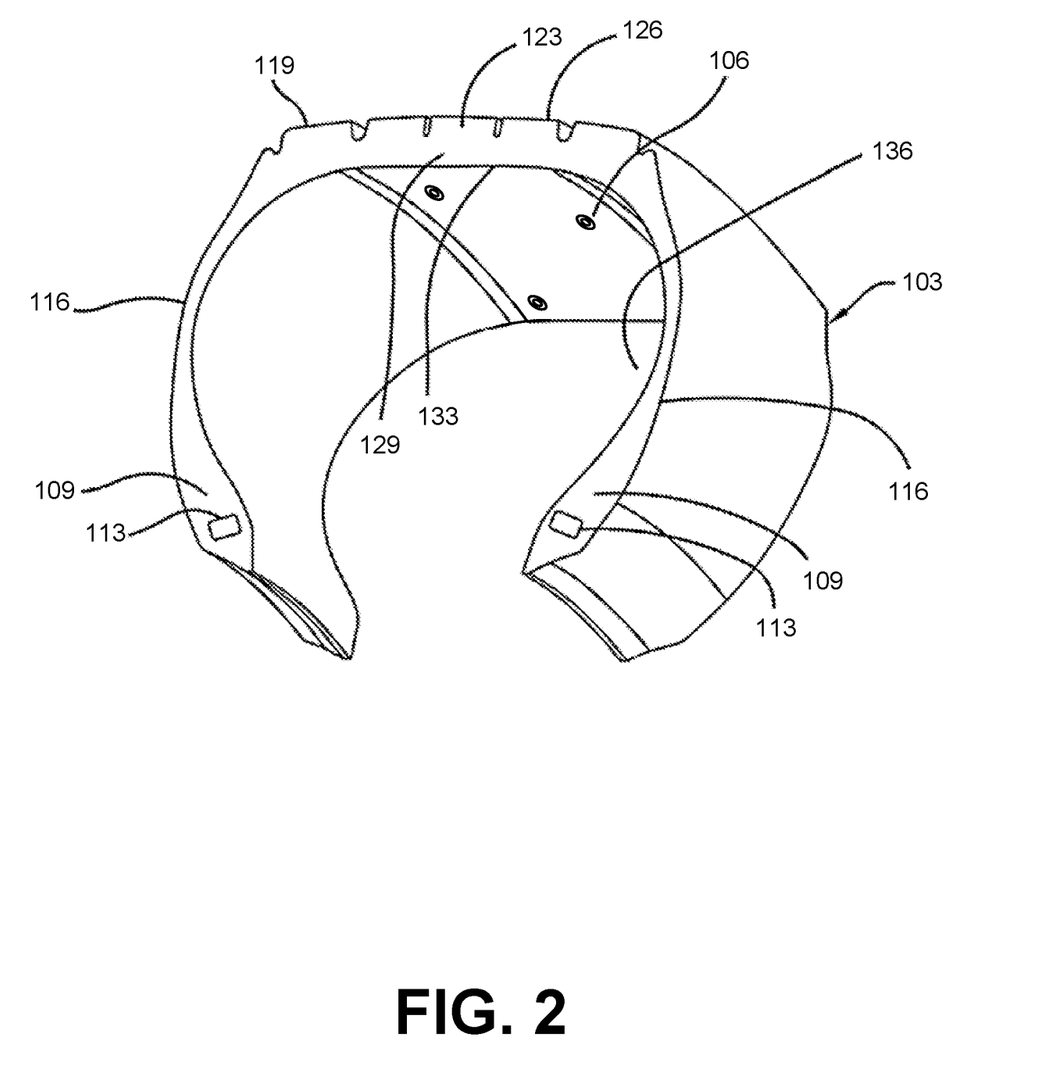
FIG. 2 is a perspective cross-sectional view of a tire shown in FIG. 1, including multiple treadwear sensors according to various embodiments of the present disclosure.

Turning to FIG. 2, shown is a cross sectional view of the tire 103 according to various embodiments. The tire 103 includes a pair of bead areas 109, each one of which is formed with a bead core 113 that is embedded in the respective bead areas 109. Each one of a pair of sidewalls 116 extends radially outwardly from a respective bead area 109 to a ground-contacting tread 119. The tread 119 is formed with multiple tread elements 123 or tread blocks and defines a radially outer surface 126. The tire 103 is reinforced by a carcass 129 that toroidally extends from one bead area 109 to the other bead area 109. An innerliner 133 is formed on the inner or inside surface of the carcass 129. The tire 103 is mounted on the flange of a wheel or rim forming an internal cavity 136.

According to one embodiment, at least one treadwear sensor 106 is inserted in the tire 103. The treadwear sensor 106 detects certain real-time parameters of the tire 103 and is preferably coupled with a pressure sensor to sense the inflation pressure within a cavity 136 of the tire 103. The treadwear sensor 106 may be included in a commercially-available tire pressure monitoring system (TPMS) module or sensing unit. The treadwear sensor 106 may be comprised of metal, rubber, or some other material. In some embodiments, the friction force between the material of the treadwear sensor 106 and the rubber of the tire 103 is enough to keep the treadwear sensor 106 in place while the tire 103 is in use. In other embodiments, an adhesive is used to secure the treadwear sensor 106 in the tire 103. In some embodiments, multiple treadwear sensors 106 are included in the tire 103 at various locations in the tread 119. Having multiple treadwear sensors 106 allows for detection of wear even in the case of uneven treadwear. For example, uneven treadwear may result in one treadwear sensor 106 being triggered while others are not.

The treadwear sensor 106 is installed in the tire 103 before the tire 103 is mounted on the wheel. In some embodiments, the treadwear sensor 106 is inserted in a green tire and cured into place. In other embodiments, the treadwear sensor 106 is inserted into the tire 103 after it is cured. Each treadwear sensor 106 includes a base plate 139 and a tube 143. The tube 143 of the treadwear sensor 106 is inserted into the tire 103 from the direction of the cavity 136 through the innerliner 133 and the carcass 129 and into the tread element 123. In some embodiments, the treadwear sensor 106 may be integrally molded as part of the innerliner 133 of the tire 103. Once the tube 143 is inserted into the innerliner 133, the base plate 139 engages a radially inward side of the innerliner 133 to provide a positive mechanical stop for the treadwear sensor 106. The base plate 139 also provides a seal about the treadwear sensor 106 to prevent the treadwear sensor 106 from dislodging.

In some embodiments, the tube 143 extends through the tread element 123 and may have an end which is flush with the outer surface 126 of the tread element 123. In other embodiments, an end of the tube 143 is not flush with the outer surface 126 of the tread element 123 but is disposed at a wear depth within the tread 119. In some embodiments, the tube 143 is formed of a material which has an air barrier greater than or equal to that of the innerliner 133, is a durable material, and is capable of bonding with the rubber components of the tire 103. In some embodiments, the tube 143 is formed of a material that includes mechanical properties, such as shear modulus, which are similar to those of the material of the tread 119. Such similarity ensures that there are no rigid components within the structure of the tire 103, thereby enabling the tube 143 of the treadwear sensor 106 to behave like a compatible plug in the tread element 123. However, in other embodiments, the tube 143 is formed of a metal or other dissimilar material.

The treadwear sensor 106 is designed such that the end of the tube 143 wears with the tread 119 until the tread 119 reaches a wear depth. The wear depth on the tube 143 coincides with the beginning of the channel 146. Thus, when the tread 119 is worn down to the wear depth, the channel 146 of the treadwear sensor 106 becomes exposed to the air, and air begins to leak through the treadwear sensor 106. The leak of the treadwear sensor 106 is designed to be slow and unique compared to other common tire leaks, such as punctures or tears. The treadwear sensor 106 can be designed such that the leak changes with the degree of wear on the tire 103. In some embodiments, a pressure sensor can detect the leak signature of the treadwear sensor 106 and work with other systems to alert a user that the tread 119 is worn. In some embodiments, the leak of the treadwear sensor 106 causes the tire 103 to go flat before the treadwear causes hazardous driving conditions.

Figure 3A:
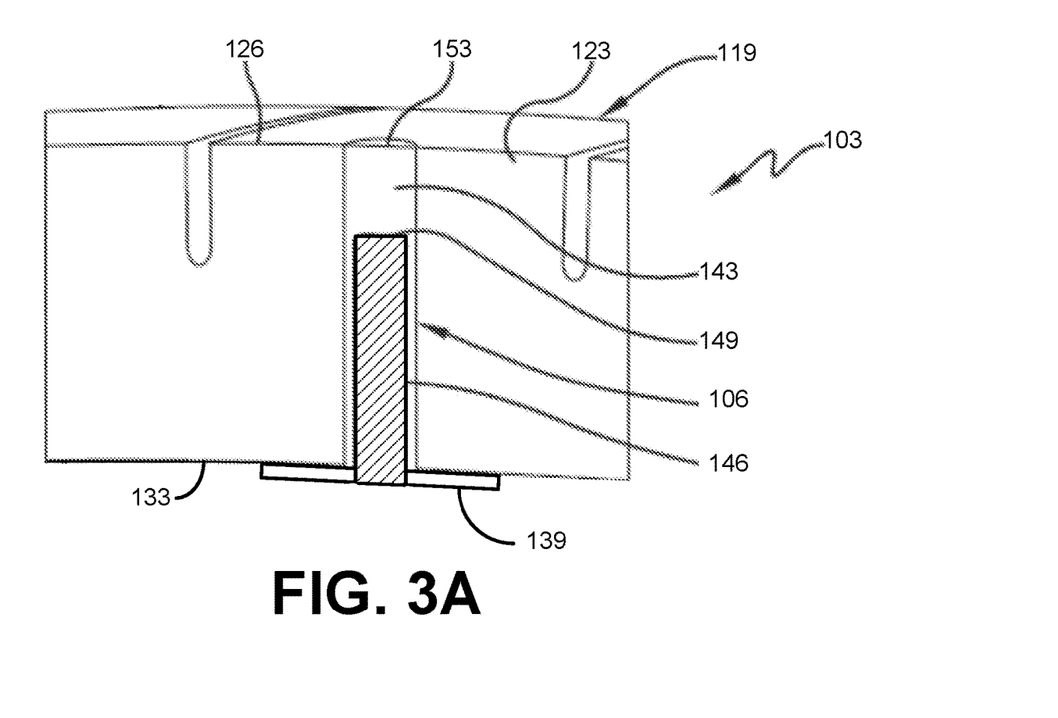
FIG. 3A is a cross-sectional perspective view of the treadwear sensor installed in the tire shown in FIG. 2, with the tire in an unworn state according to various embodiments of the present disclosure.
Figure 3B:
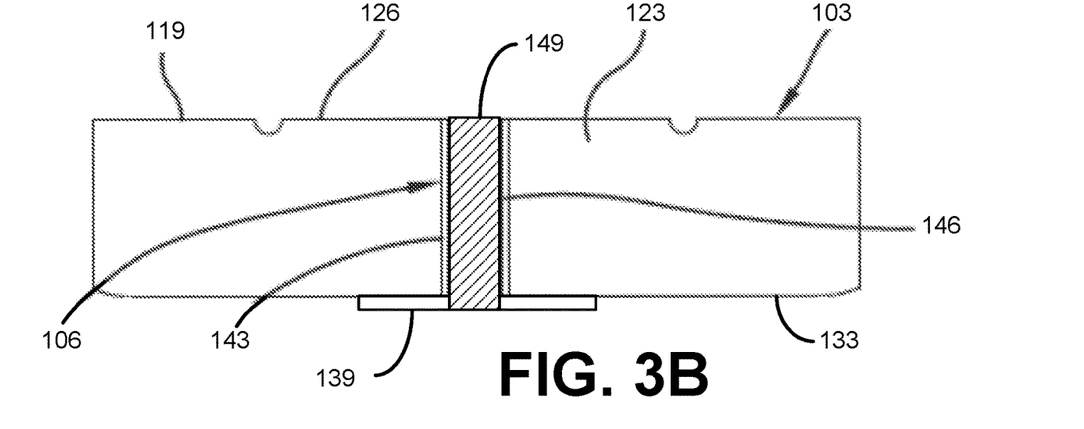
FIG. 3B is a cross-sectional perspective view of the treadwear sensor installed in the tire shown in FIG. 2, with the tire in a worn state according to various embodiments of the present disclosure.

Turning to FIG. 3, shown is cross-sectional view of the treadwear sensor 106 in the tread 119 of a tire 103. In FIG. 3A, the tread 119 is in an unworn state. In FIG. 3B, the tread 119 is in a worn state. The treadwear sensor 106 is inserted through the innerliner 133 of the tire 103 and may extend to the radially outer surface 126 of the tire 103. In this respect, the tube 143 extends through various components such as a belt package, the undertread, and other components of the tire 103. The treadwear sensor 106 comprises a base plate 139 and a tube 143 extending from the base plate 139. The base plate 139 lays flush against a radially inward side of the innerliner 133. In some embodiments, the base plate 139 is connected to a pressure sensor. In some embodiments, the tube 143 extends away from the base plate 139 in a substantially perpendicular direction. In other embodiments, the tube 143 extends away from the base plate 139 at an angle between 80 and 45 degrees.

As shown in FIG. 3A, the tube 143 extends through the innerliner 133 and may extend through the tread element 123 to the radially outer surface 126 of the tire 103. The tube 143 includes a channel 146 which extends at least partially through the tube 143. In some embodiments, the channel 146 extends through the tube 143 to a wear depth. The wear depth can be indicative of the level of treadwear which has occurred. For example, the wear depth can be the depth in the tread 119 that, when reached, signifies the need to replace the tire 103.

In some embodiments, the channel 146 is at least partially filled with a semi-permeable filler 149. The semi-permeable filler 149 can have a lower air permeability than a hollow channel 146 to allow for a slow leak. The semi-permeable filler 149 can be a polymer, foam, plastic, or some other material which is permeable to air. In other embodiments, the channel 146 is hollow. In such embodiments, the diameter of the channel 146 can be optimized to result in a leaking rate ( $$\frac{\Delta P}{\Delta t},$$

where $\Delta P$ is the change in pressure (P) and $\Delta t$ is the change in time (t)) based on the following equation:

$$\frac{\Delta P1}{\Delta t} \leq R \ll \frac{\Delta P2}{\Delta t}$$

In this equation, $$\frac{\Delta P1}{\Delta t}$$

is the minimum pressure drop rate that a pressure sensor can detect. A sensor detects the limitation of pressure change ($\Delta P1 = P0 - P1$) over a period of time $\Delta t$. In this equation, $$\frac{\Delta P2}{\Delta t}$$

is an unsafe leaking rate for a tire 103. R is a design range of a detected leaking rate for detecting a worn tire 103 safely. R is related to the diameter, length, and semi-permeable filler 149 of the channel 146.

The tube 143 includes a solid end 153 which may be flush with the radially outer surface 126 of the tread 119. In some embodiments, the solid end 153 is located within the tread 119 at a wear depth. The solid end 153 of the tube 143 wears at the same rate as the tread 119. When the tread 119 wears beyond the wear depth, the solid end 153 is worn away, and the channel 146 is exposed. In some embodiments, the solid end 153 of the tube 143 is made of the same rubber as the tread 119.

In FIG. 3B, the tread 119 of the tire 103 is worn such that the solid end 153 of the tube 143 has been eroded down to the channel 146. When the tread 119 is worn and the channel 146 is exposed to air through the tire 103, air will begin to leak through channel 146. In some embodiments, air leaks slowly through the semi-permeable filler 149 disposed inside the channel 146. A pressure sensor coupled with the treadwear sensor 106 can detect the leak signature produced by the treadwear sensor 106.

Figures 4A, 4B, 4C:
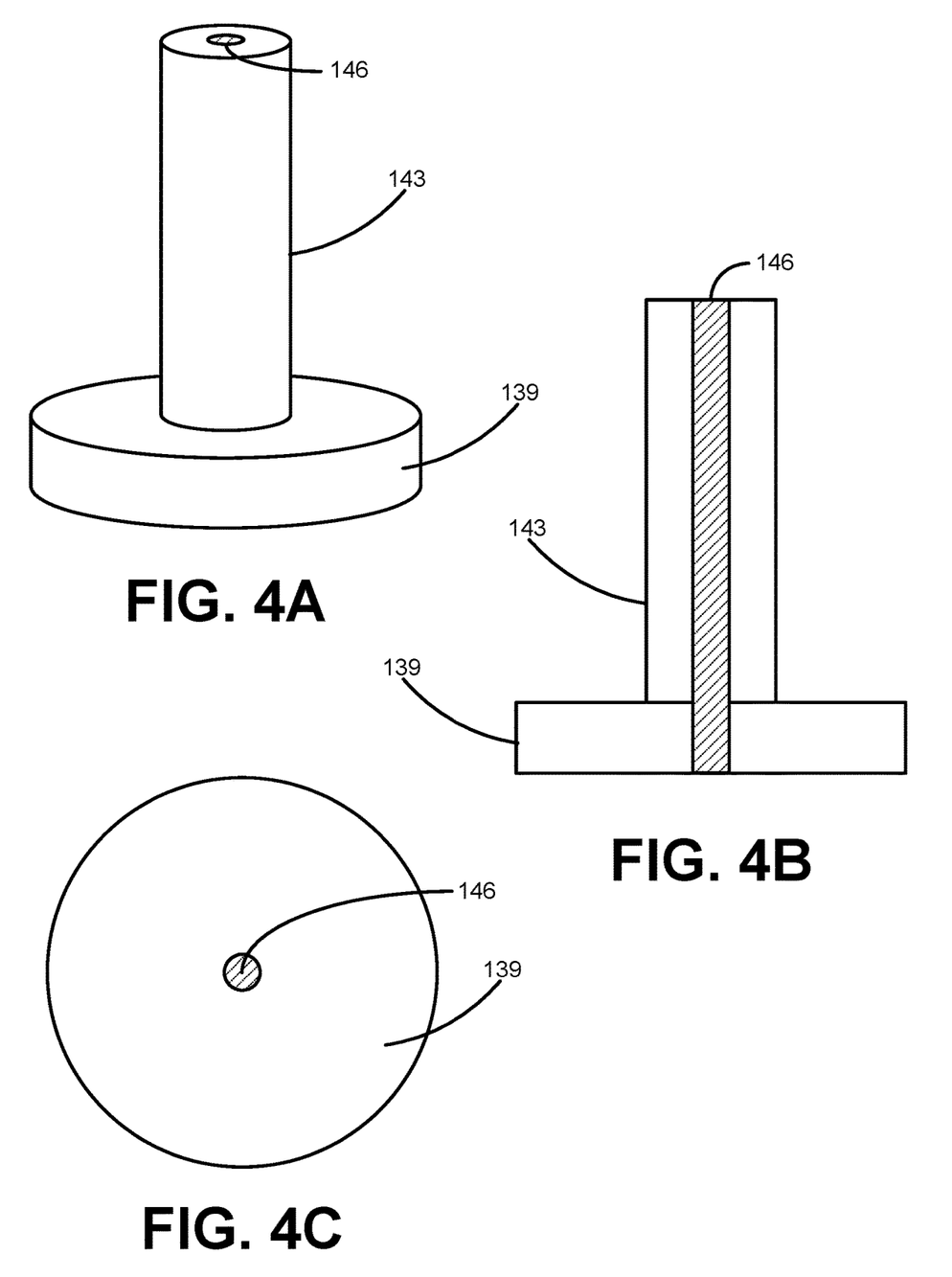
FIGS. 4A-C depict various views of the treadwear sensor of FIG. 3 according to various embodiments of the present disclosure.

Moving on to FIG. 4, shown is a treadwear sensor 106 in a worn state. FIG. 4A shows a perspective view of the worn treadwear sensor 106. FIG. 4B shows a cross-sectional side view of the treadwear sensor 106. FIG. 4C shows a bottom view of the treadwear sensor 106. The treadwear sensor 106 includes a base plate 139 and a tube 143 which has a hollow channel 146. While depicted in FIG. 4 as separate components, the base plate 139 and the tube 143 may be formed as one contiguous piece. In the worn state, the channel 146 extends from a hole in the base plate 139 through the tube 143 allowing air to flow through the treadwear sensor 106. While FIG. 4 depicts the base plate 139, the tube 143, and the channel 146 as circular or cylindrical, many other shapes may be possible in other embodiments. For example, the tube 143 and/or channel 146 can be rectangular, conical, triangular, or any other similar shape as can be appreciated. Similarly, the base plate 139 may be circular, oblong, rectangular, triangular, or any other similar shape as can be appreciated.

Figures 5A, 5B, 5C:
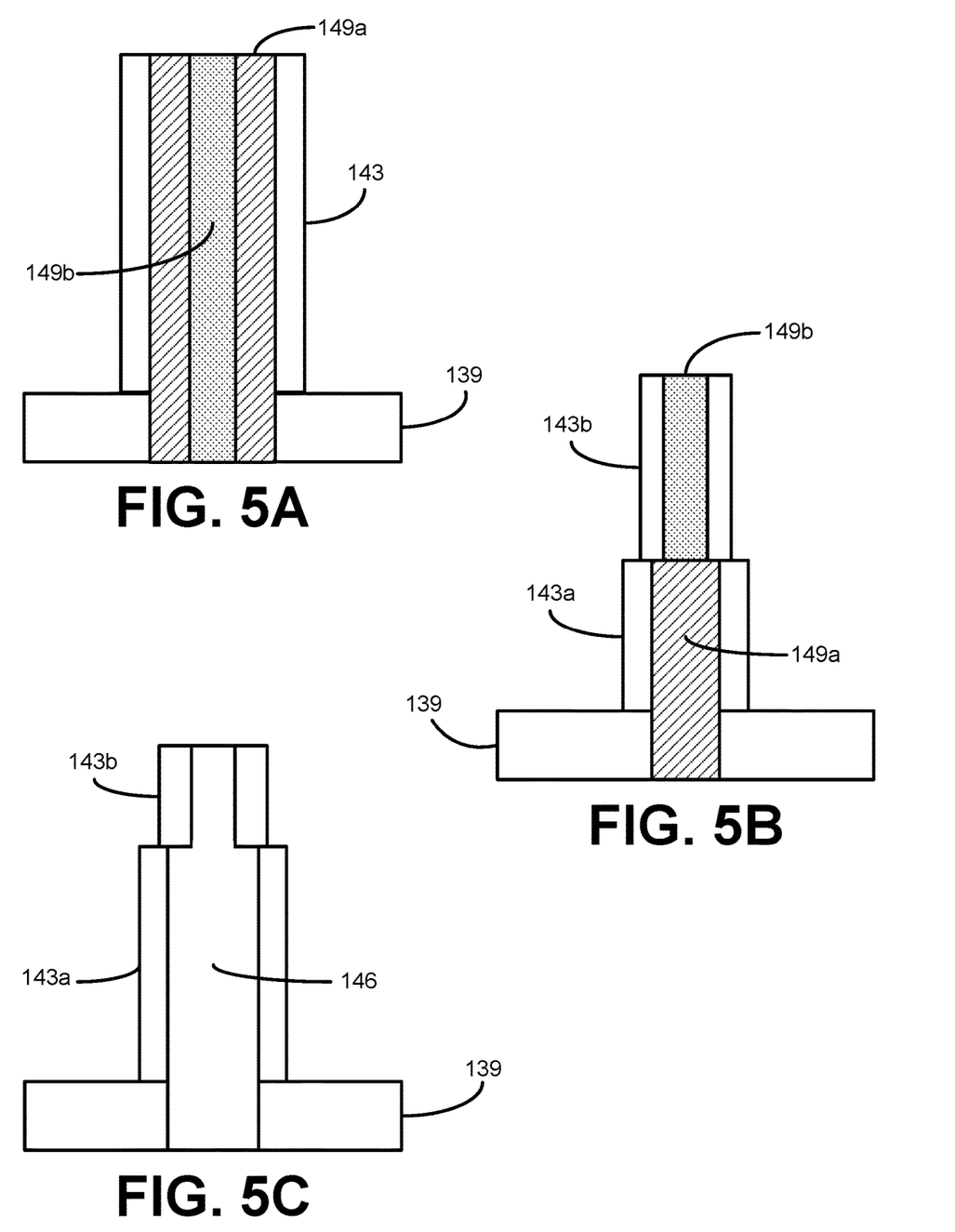
FIG. 5A-C depict cross-sectional views of the treadwear sensor of FIG. 3 according to various embodiments of the present disclosure.

Referring next to FIG. 5, shown are cross-sectional side views of various embodiments of the treadwear sensor 106. According to one embodiment, shown in FIG. 5A, the treadwear sensor 106 includes a first semi-permeable filler 149a and a second semi-permeable filler 149b, where the first semi-permeable filler 149a is a different material than the second semi-permeable filler 149b. In some embodiments, the first semi-permeable filler 149a surrounds the second semi-permeable filler 149b and both fillers extend the length of the channel 146. In other embodiments, the first semi-permeable filler 149a and the second semi-permeable filler 149b are layered throughout the channel 146. Further embodiments may include third, fourth, or more semi-permeable fillers 149 as well.

According to another embodiment, shown in FIG. 5B, the tube 143 includes a first tube portion 143a and a second tube portion 143b, where the first tube portion 143a has a different diameter than the second tube portion 143b. In some embodiments, the channel 146 has a first diameter in the first tube portion 143a and a second diameter in the second tube portion 143b. In further embodiments, the channel 146 in the first tube portion 143a is filled with a first semi-permeable filler 149a and the channel 146 in the second tube portion 143b is filled with a second semi-permeable filler 149b. In some embodiments, both the first tube portion 143a and the second tube portion 143b are filled with the same semi-permeable filler 149. Further embodiments may include having third, fourth, or more tube portions 143 with channels 146 of varying diameters and potentially various semi-permeable fillers 149 as well.

According to another embodiment shown in FIG. 5C, the first tube portion 143a is longer than the second tube portion 143b. In some embodiments, the second tube portion 143b is longer than the first tube portion 143a. While FIGS. 5A-C depict various embodiments of the treadwear sensor 106, the treadwear sensor 106 is not limited to these embodiments. Any combination of tube portions 143a, 143b, channel 146 diameters, semi-permeable fillers 149, or other features which generate a unique leak signature, distinct from that of a typical tire puncture or tear, can be used to form the treadwear sensor 106.

In the embodiments shown in FIGS. 5A-C as well as other embodiments, the leak signature of air flowing through the channel 146 changes as treadwear progresses. For example, when the second tube portion 143b of a treadwear sensor is exposed through the tread 119, the leak through the channel 146 will be a first value. However, when the wear progresses such that the first tube portion 143a is exposed through the tread 119, the leak through the channel will increase in value. In this manner, the first leak value, the second leak value, and/or a change in leak values could be detected to inform a user that the tread 119 is too low.

Figure 6:
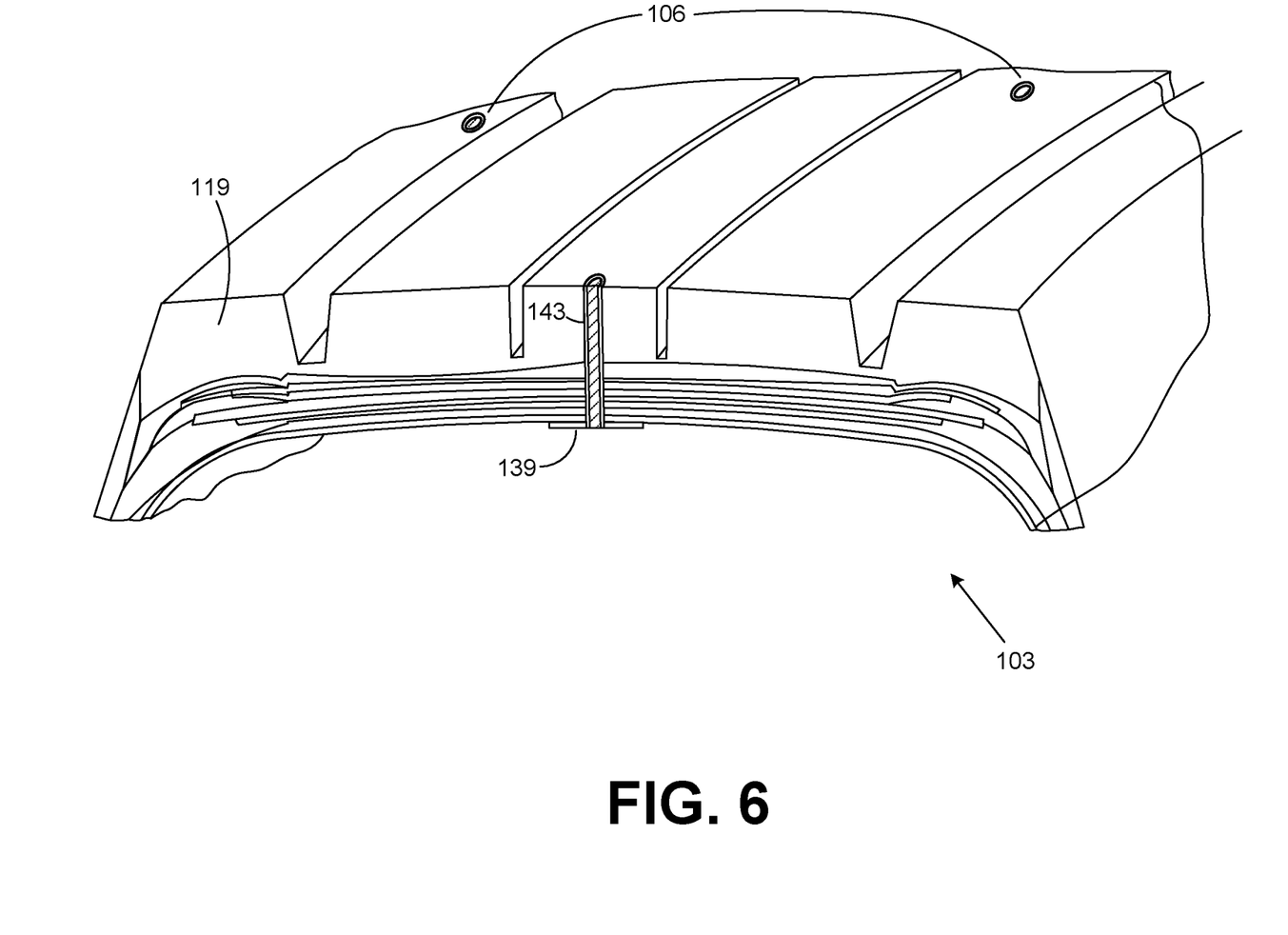
FIG. 6 is a partial cross-sectional perspective view of a portion of a tire of FIG. 2 including a treadwear sensor, with the tire in a worn state according to various embodiments of the present disclosure.

Moving on to FIG. 6, as the tread 119 wears, the tube 143 of the treadwear sensor 106 also wears. When the tread 119 and the tube 143 wear down to the wear depth, the distal end of the tube 143 is eroded to the beginning of the channel 146, creating a passageway for air to flow from the cavity 136 of the tire 103 out through the channel 146. The predefined wear depth can be the minimum recommended tread depth of the tire 103. The leak caused by the treadwear sensor 106 signifies that the minimum tread depth has been reached, and thus indicates when replacement or retreading of the tire 103 should take place.

In this manner, the tire 103 with a treadwear sensor 106 indicates tire wear with components that are mounted within the tire 103 and does not require sensors that are external to the tire 103. The tire 103 with a treadwear sensor 106 provides a direct wear sensor system for a vehicle tire 103 that includes a structure which is easy to install in the tire 103, withstands the operating environment of the tire 103, and accurately indicates tire wear in a repeatable manner.

The present disclosure also includes a method of determining wear of a tire using a treadwear sensor 106. This method includes steps in accordance with the description that is presented above and shown in FIGS. 1 through 5.

It is to be understood that the structure of the above-described tire with a treadwear sensor 106 may be altered or rearranged, or components or steps known to those skilled in the art omitted or added, without affecting the overall concept or operation of the various embodiments. For example, a single treadwear sensor 106 may be disposed in the tread 119 of the tire 103, or multiple treadwear sensors 106 may be disposed in the tread 119 about the tire 103. In addition, the treadwear sensor 106 may be inserted into the tread element 123 before or after curing of the tire 103.

The tire 103 includes a predefined minimum tread depth. As a tire 103 is put into service on a vehicle over time, the tread 119 will wear down. The predefined minimum tread depth is a minimum recommended tread depth at which the tire 103 can be placed into service. Once the tread 119 wears below the predefined minimum tread depth, then the tire 103 should be taken out of service. The tread 119 of the tire 103 thus includes a sacrificial portion that is expected to wear away over time while the tire 103 is in service.

In addition, the treadwear sensor 106 may be located at any lateral position on the tread 119 of the tire 103. For example, the treadwear sensor 106 may be placed at positions across the tread 119 from each other or any other position on the tread 119 or in a given tread element 123 as shown. In this manner, the treadwear sensors 106 may be positioned to detect treadwear at any lateral location on the tread 119 of a tire 103. For example, it may be desirable to detect various levels of wear of a tread 119 at different lateral locations on the tread 119 to determine whether uneven treadwear is occurring.

With reference to FIGS. 1 through 6, in view of the foregoing discussion, below is a description of the various embodiments of the present disclosure. It is understood that the below embodiments are not an exhaustive recitation of the possible embodiments of the present disclosure and that other embodiments are described herein.

Embodiment 1 is a tire comprising an innerliner, a plurality of belts layered adjacent to the innerliner, a tread adjacent to the plurality of belts opposite the innerliner, and a treadwear sensor positioned in the innerliner. The treadwear sensor comprises a base plate on an interior side of the innerliner, and a tube extending from the base plate through the innerliner and the plurality of belts to a first wear depth in the tread. When the tread is worn to the first wear depth, an end of the tube is exposed through the tire.

Embodiment 2 is the tire of embodiment 1 further comprising a plurality of the treadwear sensors dispersed throughout the innerliner.

Embodiment 3 is the tire of embodiments 1 or 2, wherein the treadwear sensor further comprises a channel extending through the tube from a hole in the base plate to a distal end of the tube. When the tread is worn to the first wear depth, an amount of air passes through the channel.

Embodiment 4 is the tire of embodiments 2 or 3 wherein the treadwear sensor further comprises a semi-permeable filler within the channel. When the tread is worn to the first wear depth, a reduced amount of air passes through the semi-permeable filler within the channel.

Embodiment 5 is the tire of embodiments 2 through 4 wherein the channel further comprises at least a first portion having a first diameter and at least a second portion having a second diameter.

Embodiment 6 is the tire of embodiment 5 wherein the treadwear sensor further comprises a first semi-permeable filler within the first portion of the channel.

Embodiment 7 is the tire of embodiment 6 wherein the treadwear sensor further comprises a second semi-permeable filler within the second portion of the channel.

Embodiment 8 is a method comprising providing a treadwear sensor having a tube and a base plate disposed at a first end of the tube, where the treadwear sensor configured to produce a unique leak signature when a tread is worn to a wear depth. The method further comprises inserting the tube of the treadwear sensor through an innerliner of a tire such that a second end of the tube is disposed in a tread of the tire at the wear depth and the base plate is adjacent to the innerliner.

Embodiment 9 is the method of embodiment 8 wherein the tire is a green tire. The method of embodiment 9 further comprises curing the green tire around the tube of the treadwear sensor.

Embodiment 10 is the method of embodiments 8 or 9 further comprising filling at least a portion of the tube with a semi-permeable filler.

Embodiment 11 is the method of embodiments 8 through 10 further comprising positioning the treadwear sensor adjacent to a pressure sensor on the innerliner of the tire.

Embodiment 12 is the method of embodiments 8 through 11 further comprising attaching a pressure sensor to the base plate of the treadwear sensor.

Embodiment 13 is the method of embodiments 8 through 12 wherein the treadwear sensor is one of a plurality of treadwear sensors. The method of embodiment 13 further comprises inserting the plurality of treadwear sensors in the tire such that the plurality of treadwear sensors are dispersed across the tread.

Embodiment 14 is an apparatus comprising a base having a hole, an elongated member extending from the base, and a channel connecting the hold of the base to a distal end of the elongated member.

Embodiment 15 is the apparatus of embodiment 14 further comprising a first semi-permeable filler within the channel.

Embodiment 16 is the apparatus of embodiments 14 or 15 further comprising a second semi-permeable filler extending through the channel and being disposed within the first semi-permeable filler.

Embodiment 17 is the apparatus of embodiments 14 through 16 further comprising a pressure sensor attached to the base.

Embodiment 18 is the apparatus of embodiments 14 through 17 wherein the channel comprises at least a first portion having a first diameter and at least a second portion having a second diameter.

Embodiment 19 is the apparatus of embodiment 18 further comprising a first semi-permeable filler in the first portion of the channel.

Embodiment 20 is the apparatus of embodiment 18 or 19 further comprising a second semi-permeable filler in the second portion of the channel.

In the present disclosure, disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A tire, comprising:
   an innerliner;
   a plurality of belts layered adjacent to the innerliner;
   a tread adjacent to the plurality of belts opposite the innerliner; and
   a treadwear sensor positioned in the innerliner, the treadwear sensor comprising:
   a base plate on an interior side of the innerliner;
   a tube extending from the base plate through the innerliner and the plurality of belts to a first wear depth in the tread such that an end of the tube is exposed through the tire when the tread is worn to the first wear depth;
   a channel extending through the tube from a hole in the base plate to a distal end of the tube such that an amount of air passes through the channel when the tread is worn to the first wear depth.

2. The tire of claim 1, further comprising a plurality of the treadwear sensors dispersed throughout the innerliner.

3. The tire of claim 1, wherein the treadwear sensor further comprises a semi-permeable filler within the channel such that a reduced amount of air passes through the semi-permeable filler within the channel when the tread is worn to the first wear depth.

4. The tire of claim 1, wherein the channel further comprises at least a first portion having a first diameter and at least a second portion having a second diameter, where the first diameter is greater than the second diameter.

5. The tire of claim 4, wherein the treadwear sensor further comprises a first semi-permeable filler within the first portion of the channel.

6. The tire of claim 5, wherein the treadwear sensor further comprises a second semi-permeable filler within the second portion of the channel.

* * * * *